United States Patent [19]
Van Alstine

[11] Patent Number: 5,490,330
[45] Date of Patent: Feb. 13, 1996

[54] CUTTING HEAD STABILIZER FOR TIRE GROOVER

[76] Inventor: Guy A. Van Alstine, 27 W. Cherry Ave., Trappe, Pa. 19426

[21] Appl. No.: 305,863

[22] Filed: Sep. 14, 1994

Related U.S. Application Data

[63] Continuation of Ser. No. 19,201, Feb. 18, 1993, abandoned, which is a continuation-in-part of Ser. No. 812,103, Dec. 23, 1991, abandoned.

[51] Int. Cl.⁶ .................................................. B29D 30/68
[52] U.S. Cl. ................................................. 30/140; 30/293
[58] Field of Search ........................... 30/140, 286, 289, 30/294

[56] References Cited

U.S. PATENT DOCUMENTS

| | | | |
|---|---|---|---|
| 1,926,520 | 9/1933 | Fox | 30/140 |
| 1,934,181 | 11/1933 | Fouke | 30/140 |
| 2,013,234 | 9/1935 | Campbell | 30/140 |
| 2,031,472 | 2/1936 | Errig et al. | 30/140 |
| 2,063,894 | 12/1936 | Jack et al. | 30/140 |
| 2,140,478 | 12/1938 | Mossback | 30/140 |
| 2,157,151 | 5/1939 | Stackhouse | 30/140 |
| 2,230,042 | 1/1941 | Mertens | 30/140 |
| 2,240,382 | 4/1941 | Van Alstine | 30/140 |
| 2,254,974 | 9/1941 | Olson et al. | 30/140 |
| 2,618,056 | 11/1952 | Van Alstine | 30/140 |
| 2,846,059 | 7/1959 | Ruff | 219/21 |
| 2,986,204 | 5/1961 | Wilson et al. | 157/13 |
| 4,797,999 | 1/1989 | Van Alstine | 30/140 |
| 5,179,782 | 1/1993 | Van Alstine | 30/140 |

Primary Examiner—Hwei-Siu Payer
Attorney, Agent, or Firm—Schnader Harrison Segal & Lewis

[57] ABSTRACT

A cutting head stabilizer for controlling the movement of the substantially U-shaped cutting blade of a tire groover. The stabilizer facilitates the rapid and precise movement of the substantially U-shaped cutting blade about the gripping surface of a tire.

24 Claims, 5 Drawing Sheets

CUTTING HEAD STABILIZER FOR TIRE GROOVER

CROSS REFERENCE TO RELATED APPLICATION

This a continuation of application Ser. No. 08/019,201 filed on Feb. 18, 1993, now abandoned, which is a continuation-in-part of U.S. patent application Ser. No. 07/812,103, filed Dec. 23, 1991, now abandoned.

FIELD OF THE INVENTION

The present invention relates generally to the cutting or grooving of rubber or other heat sensitive materials. The present invention more particularly relates to the grooving of rubber tires used on various vehicles, including trucks and other motor vehicles and to a cutting head member for a resistance-heated tire groover. The present invention also relates to a resistance-heated tire groover that incorporates a cutting head member and facilitates the grooving of rubber tires in a rapid, efficient, and precise manner.

BACKGROUND

It has long been known that tires for various vehicles, although worn smooth as a result of extended operation on abrasive road surfaces, nonetheless retain significant amounts of rubber on their circumferential surfaces so that new tread patterns may be cut or "grooved" into such surfaces, thereby allowing the tires to be returned to service and their operable lives extended for thousands of additional miles. Grooving of tires has been particularly prevalent in the trucking industry, where tractor/trailer vehicles can have up to 18 large tires, each of which costs several hundred dollars when purchased new. Obviously, a grooving technique that allows such tires to be rejuvenated so that their operable lives are significantly extended has found great favor with tractor/trailer owners and operators.

Previous tire groovers most often have operated by means of a heated cutting blade that slices through the rubber material on the circumferential surface of the tire being grooved. Such known tire groovers are discussed and referenced in U.S. Pat. No. 4,797,999, to Van Alstine, which is hereby incorporated in its entirety herein by reference. Known tire groovers have typically employed a sliding block or similar surface positioned completely behind or between the legs of a U-shaped cutting blade for guiding or steadying the tire groover along the circumference of the tire during grooving operations. In such tire groovers a sliding block or surface is always placed either rearward of the cutting edge of the blade or between the legs of the U-shaped blade, so that the sliding block or surface typically rides above a freshly cut portion of tire material which is squeezed or pinched between the blade legs and sliding block during tire grooving operations.

It is difficult to accurately control the movement of known tire groovers, because such known tire groovers tended to rock about the circumferential surface of a tire being grooved. Such rocking typically results in the creation of a groove having an uneven and imprecise depth. In known tire groovers, the operator's hand or hands, which provide the cutting force to the tool, is positioned above the cutting plane of the blade. When the operator applies cutting pressure the tool tends to rock forward with the blade acting as a pivot point. When the tool rocks forward increased friction is created at the front of the tool because the blade becomes angled or biased and is thereby pulled into the rubber. At this point, the tool typically begins to ride only on its front corner. As the tool continues to be pulled into the rubber by virtue of the angular orientation of the blade, any forward force exerted by the operator tends to jam the tool into the rubber. If the operator rocks the tool back to correct for this effect, he can easily bias the blade to cut out of the rubber thereby reducing the cutting depth. If he rocks the tool forward as a correction for this, he again creates the jamming effect at the front of the tool. Since the sliding block is free to rock about the rounded tire surface, the feel for the correct cutting angle is extremely vague and there is no way for an operator to "lock" the blade at a proper working angle. The result is a groove having an inconsistent depth.

During operation of known tire groovers, tire material immediately following the cutting blade is often trapped snugly between the blade sides and the sliding block or surface of the tool. As the cut is made, this trapped rubber must be squeezed (almost extruded) through the opening formed by the blade sides and the sliding block. The friction from this squeezing effect produces the need for more force from the operator to make a cut and also gives the cutting resistance of the tool a variable feel. In addition, known tire groovers tend to rock about the tire surface during operation. As the tool rocks, the cutting angle of the blade varies, sometimes pulling the tool towards and other times pushing it away from the tire surface. From this action, the sliding block of the tool is constantly making and breaking contact with the tire surface. As the sliding block comes in and out of contact with the tire surface, the variable feel of the cutting resistance is further aggravated.

In known tire groovers, the cutting blade and the sliding block or surface are fixed in space with respect to each other so that a change in position of the sliding block is immediately reflected by a corresponding change in the position of the cutting blade. During tire grooving, tire material immediately following the cutting edge of the blade is typically pinched or raised. This occurs because, at the point of the cut, the cutting blade which has its own thickness is interposed between the tire itself and the portion of tire material lying above the blade, which portion is cut away. Since this cut away portion of tire material is not immediately removed at the time of the cut, but instead remains in a tire groove for a short time thereafter, the sliding block or surface must ride above or along a pinched or raised surface during cutting.

When the sliding block or surface is caused to rise as a result of pinched or raised tire material, a corresponding change in the position and typically the height of the cutting blade occurs. This change in blade position causes a corresponding change or variation in the depth of the cut made by the tire grooving mechanism. Since the degree to which tire material is pinched or raised during cutting is typically not uniform, a groove having an uneven and imprecise depth often results. Moreover, the pinching or squeezing effect tends to increase friction between the sliding block and the tire surface creating a variable feel to the cutting resistance. This variable feel makes it difficult for an operator to properly control the tool during operation. In the past, rollers have been substituted for the sliding block in order to minimize friction between the tool and the tire surface. However, such rollers tend to give an uneven or imprecise cut because they allow the tool to rock about the tire surface.

It was found that the tire material which is pinched or raised during cutting, as well as the rearward positioning itself of the sliding surface, caused general difficulties in guiding or steadying the tire grooving mechanism during operations. It was further found that this pinching effect was a problem when cutting across a tire side or across already existing grooves. When beginning to cut at an existing groove but not in the same direction as that groove, the front edge of the cut rubber, now raised because the blade is passing under it, can catch against the front edge of a sliding block and completely stop the forward movement of the tool. This same problem occurs when the cut is started on the side of the tire.

In push type tire groovers, the sliding surface which should be in contact with the tire surface is typically blocked visually from the operator. Without the proper visual orientation, it is difficult for an operator to confirm that the tool is at a proper angle or depth.

It is an object of this invention to provide a stabile and precise mechanism for guiding and controlling the movement of a head member for a resistance-heated tire groover that greatly facilitates the accurate movement of a head member along the circumferential surface of a subject tire.

It is a further object of this invention to eliminate inaccuracies in groove depth caused by pinched or raised tire material.

It is a further object of this invention to eliminate the squeezing of cut rubber between the blade legs and the sliding surface of a tire groover.

These and other objects of the invention will be better appreciated after reading the succeeding description of the invention in conjunction with the accompanying drawings.

SUMMARY OF THE INVENTION

The disclosed invention provides a cutting head stabilizer for controlling the movement of a cutting blade of a resistance-heated tire groover. The preferred embodiment facilitates the rapid and precise movement of a substantially U-shaped cutting blade about the gripping surface of a tire. In accordance with the present invention, an apparatus for cutting a tire groove comprises stabilizer means for guiding a cutting head member in a cutting direction along the gripping surface of a tire. The cutting head member includes a cutting edge for cutting through the tire in the cutting direction. The stabilizer means includes a forward edge positioned before the cutting edge along the cutting direction.

In the preferred embodiment, the cutting head member has a metal cutting head housing that is divided into two sub-housings that are electrically insulated from each other. The cutting head housing is adapted to slidably accept and retain a plurality of metal clamping spacers. The plurality of clamping spacers is divided into two parts, each of which is separated from the other by a floating insulator slidably interposed within the cutting head housing, so that the clamping spacers on one side of the floating insulator are in contact only with each other and with one of the sub-housings, while the clamping spacers on the other side of the floating insulator are in contact only with each other and with the other sub-housing. one of the sub-housings is provided with a threaded locking piece which, when advanced, causes the plurality of clamping spacers and the floating insulator to tighten against each other and against the ends of a substantially U-shaped metal cutting blade interposed between the clamping spacers.

DETAILED DESCRIPTION OF THE PREFERRED EMBODIMENT

Figure 1:
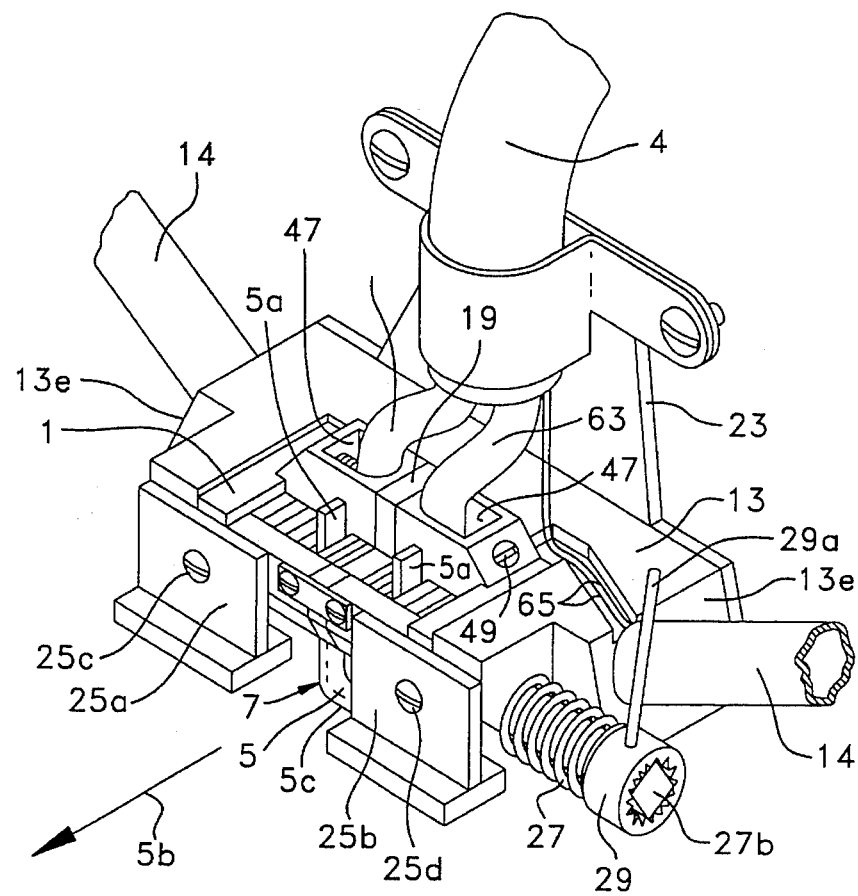
FIG. 1 is a partial perspective view of a pull type tire groover incorporating a preferred embodiment of the present invention.
Figure 2:
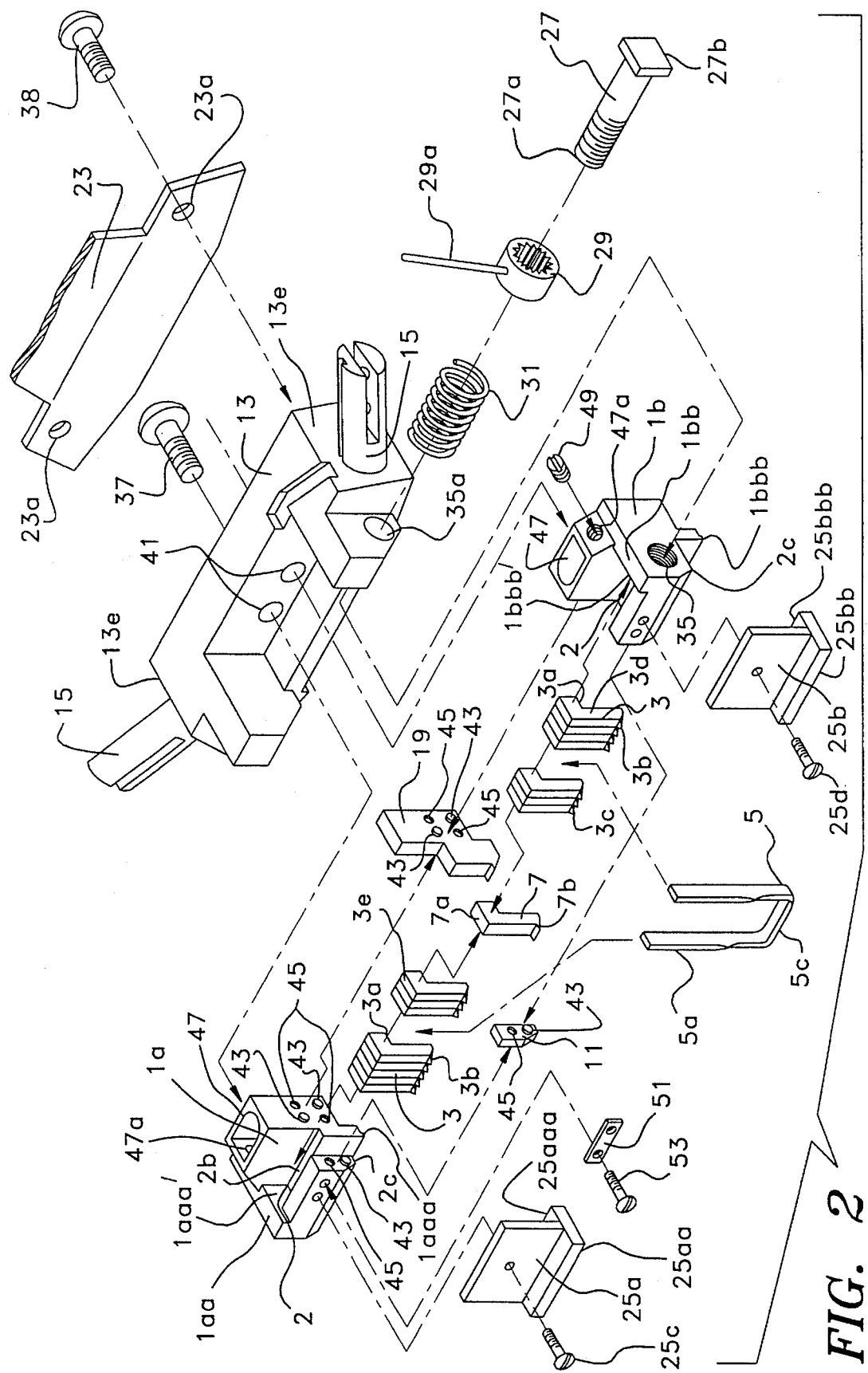
FIG. 2 is a partial perspective view in "exploded" form of the preferred embodiment of the invention shown in FIG. 1.

Referring now to FIGS. 1 and 2, there is shown a pull type tire groover incorporating a preferred embodiment of the present invention. More particularly, there is shown a substantially U-shaped metal cutting blade 5 for cutting a groove in the circumferential rubber (or road gripping) surface of a tire. Metal cutting blade 5 has a cutting edge 5c and a cutting direction illustrated by arrow 5b. Cutting blade 5 is fixed in position with respect to cutting head member 1 by clamping spacers 3 and locking piece 27. First and second stabilizer members 25a, 25b for accurately positioning and guiding cutting head member 1 along the circumferential rubber surface of a tire being grooved are secured to cutting head member 1 by screws 25c, 25d. First and second stabilizer members 25a, 25b are defined by forward edges 25aa, 26bb, respectively, and rearward edges 25aaa, 26bbb, respectively. Forward edges 25aa, 25bb lie in front of a reference line normal to cutting direction 5b and passing through cutting edge 5c.

It was found that by positioning stabilizer members 25a, 25b outside cutting blade 5 (i.e., not in between legs 5a) and in front of (or before) a reference line normal to cutting direction 5b and passing through cutting edge 5c, a user's ability to accurately and precisely control the movement of blade 5 was substantially enhanced. More particularly, it was found that the positioning of stabilizer members 25a, 25b in accordance with the present invention allowed a user to more accurately control the angle and depth of blade 5 during grooving operations. In contrast to known tire groovers where the cutting blade tends to rock angularly during grooving operations, a tire groover having stabilizer members 25a, 25b positioned as described was found to "lock" at a proper angle during grooving operations thereby maintaining cutting blade 5 at a proper angle and depth. In order to further enhance control over the movement of blade 5, frictional forces between first and second stabilizing members 25a, 25b and the road gripping surface of a tire being grooved may be reduced by constructing stabilizing members 25a, 25b of a friction-reducing material such as that manufactured by E. I. du Pont de Nemours and Company under the trademark "TEFLON".

Referring still to FIGS. 1 and 2, there is shown head holder 13 which is adapted to receive and retain sub-housings 1a and 1b of head member 1 in rigid engagement with each other. Handles 14 for pulling head holder 13 in cutting direction 5b are rigidly attached to the slanted sides 13e of head holder 13, so that handles 14 extend upwardly from head holder 13 at a slight angle, thereby increasing control and maneuverability of the apparatus by an operator. Subhousings 1a and 1b are electrically insulated from each other by stationary insulators 11 and 19. A plurality of metal clamping spacers 3 is slidably interposed within sub-housings 1a, 1b. Floating insulator 7 is slidably interposed within cutting head member 1 and between clamping spacers 3 so that the clamping spacers 3 on one side of floating insulator 7 are retained within sub-housing 1a, and the clamping spacers 3 on the other side of floating insulator 7 are retained within sub-housing 1b. A threaded locking piece 27 is provided for tightening clamping spacers 3 against each other and against the legs 5a of substantially U-shaped metal cutting blade 5 inserted between clamping spacers 3. Direct electrical current is provided to sub-housings 1a and 1b, from an external transformer source (not shown) through primary electrical conductors 63 of power cable 4.

Sub-housings 1a and 1b of cutting head member 1 have a longitudinal channel 2 formed therein. Channel 2 extends vertically through sub-housings 1a and 1b from upper external surfaces 1aa and 1bb to lower external surfaces 1aaa and 1bbb. Channel 2 terminates horizontally at interior surfaces 1aaa' and 1bbb' of sub-housings 1a and 1b. The walls of channel 2 are configured to incorporate upper bearing surface 2b and lower bearing surface 2c. Clamping spacers 3 have upper retaining surfaces 3a and lower retaining surfaces 3b formed therein. When clamping spacers 3 are interposed within channel 2, upper retaining surfaces 3a slidably engage upper bearing surface 2b and lower retaining surfaces 3b slidably engage lower bearing surface 2c. The cross-sectional configuration of floating insulator 7 corresponds substantially to the cross-sectional configuration of clamping spacers 3, so that upper retaining surface 7a is adapted to slidably engage upper bearing surface 2b and lower retaining surface 7b is adapted to slidably engage lower bearing surface 2c when floating insulator 7 is interposed within channel 2.

Engagement of sub-housing 1a to sub-housing 1b with insulators 11 and 19 interposed between them is facilitated by a plurality of locating dowels 43 and corresponding locating receptacles 45 formed into sub-housings 1a and 1b and stationary insulators 11 and 19. Thus, clamping spacers 3 and floating insulator 7 are slidably interposed and retained within channel 2 of sub-housings 1a and 1b, and stationary insulators 11 and 19 are positioned between sub-housings 1a and 1b so that; head holder 13 may receive sub-housings 1a and 1b and hold them in rigid engagement to each other with stationary insulators 11 and 19 interposed between them. Sub-housings 1a and 1b are rigidly retained within head holder 13 by means of a plurality of bolts 37 which pass through holes 41 in head holder 13 and threadably engage subhousings 1a and 1b.

Head holder 13 is provided with aperture 35a, through which threaded locking piece 27 may be interposed and threadably engaged within threaded aperture 35 of sub-housing 1b. It will be understood that, when threaded locking piece 27 is sufficiently advanced so that the shank end 27a of threaded locking piece 27 protrudes horizontally through sub-housing 1b, shank end 27a of threaded locking piece 27 will abut planar surface 3d of the particular clamping spacer 3 that is immediately adjacent to threaded aperture 35 of sub-housing 1b. It will further be appreciated that, as threaded locking piece 27 is advanced in the direction of a normal right-handed screw, the plurality of clamping spacers 3 and floating insulator 7 will be caused to tighten against each other and against the ends 5a of a substantially U-shaped metal cutting blade 5 interposed between clamping spacers 3 as described herein. In order to ensure that sub-housings 1a and 1b remain rigidly attached to each other at all times, an additional bracing piece 51 is rigidly attached by screws 53 to sub-housings 1a and 1b. Head holder 13 is provided with mounting stubs 15 for handles 14 constructed of tubular stock.

Power cable 4 is provided with two primary electrical conductors 63. Sub-housings 1a, 1b have receptacles 47 formed therein, with threaded apertures 47a and threaded inserts 49 adapted to be tightened against the ends of primary electrical conductors 63 after they are inserted in receptacles 47. Power cable 4 is attached to mounting plate 23 by U-clamp 57 and a pair of screws 59. Mounting plate 23 is attached to head holder 13 by a plurality of screws 38 that pass through apertures 23a of mounting bracket 23 and threadably engage head holder 13. After an operator has selected a cutting blade 5 desired for a particular grooving operation, threaded locking piece 27 must be sufficiently withdrawn to allow enough clearance between clamping spacers 3 and floating insulator 7 so that one end 5a of cutting blade 5 may be interposed between the clamping spacers 3 in contact with sub-housing 1a on one side of floating insulator 7, and so that the other legs 5a of cutting blade 5 may be interposed between the clamping spacers 3 in contact with subhousing 1b on the other side of floating insulator 7. In order to facilitate the insertion of legs 5a of cutting blade 5 between clamping spacers 3, lower edges 3c of clamping spacers 3 are formed into an acute angle which provides for easy separation of clamping spacer 3. Depending upon the depth of the groove desired to be cut, cutting blade 5 may be inserted between clamping spacers 3 so that legs 5a protrude an appropriate distance above the upper surfaces 3e of clamping spacers 3.

Socket piece 29 having handle extension 29a is adapted to be retained by threaded locking piece 27 and to slidably engage head end 27b of threaded lock piece 27. Socket piece 29 is biased into engagement with head end 27b of threaded locking piece 27 by biasing spring 31. In this manner, socket piece 29 may be rotated to advance or withdraw threaded locking piece 27, as necessary, to effect removal, replacement or adjustment of cutting blade 5.

Figure 3:
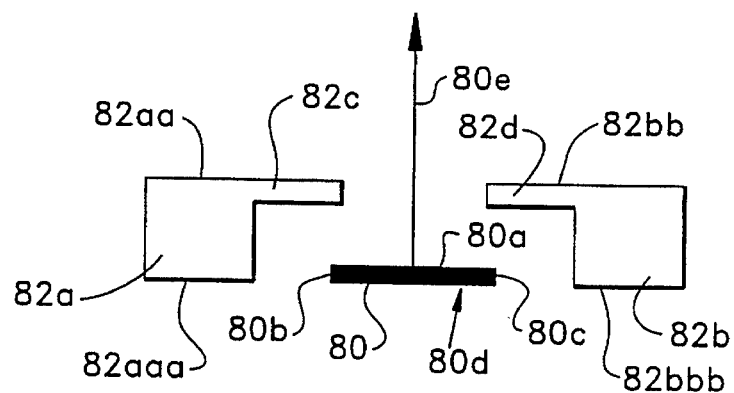
FIG. 3 is a bottom view of a U-shaped cutting blade with first and second stabilizer members positioned according to an alternate preferred embodiment of the present invention.

Referring now to FIG. 3, there is shown a bottom face of a U-shaped tire metal cutting blade 80 having cutting edge 80a and cutting direction 80e according to an alternate preferred embodiment of the present invention. First and second stabilizer members 82a, 82b for accurately guiding and positioning cutting blade 80 are positioned outside blade 80 (i.e., not in between blade sides 80b, 80c) and are defined by forward edges 82aa, 82bb, respectively, and rearward edges 82aaa, 82bbb, respectively. Cutting blade 80 is urged in the direction of the arrow 80e during grooving operations. Cutting blade 80 could be affixed to a pull-type tire groover, in which case the cutting direction of blade 80 would resemble the cutting direction of blade 5, illustrated by arrow 5b. Alternatively, cutting blade 80 could be attached to a push type tire groover, in which case the cutting direction of blade 80 would resemble the cutting direction of arrow 108*a* shown in FIG. 5. First and second stabilizer members 82*a*, 82*b* are L shaped such that forward edges 82*aa*, 82*bb* are longer than corresponding rearward edges 82*aaa*, 82*bbb*. In addition, stabilizer members 82*a* and 82*b* are symmetric to each other and about a line in the cutting direction passing through the center of blade 80. Rearward edges 82*aaa*, 82*bbb* lie on a reference line normal to the cutting direction (80*e*) passing through blade 80. Stabilizer members 82*a*, 82*b* further include legs 82*c*, 82*d* which may partially extend in front of blade 80 so as to cause stabilizer members 82*a*, 82*b* to wrap partially in front of blade 80. By wrapping the stabilizer members only partially in front of blade 80, an operator is able to maintain a clear view of the path which blade 80 needs to follow.

Although in the embodiment shown in FIG. 3, rearward edges 82*aaa*, 82*bbb* lie on a reference line normal to the cutting direction passing through blade back 80*d*, said rearward edges may lie in front of, on or behind that reference line so long as forward edges 82*aa*, 82*bb* lie in front of a reference line normal to cutting direction 80*e* and passing through cutting edge 80*a*. In accordance with a preferred embodiment of the present invention, stabilizer members 82*a*, 82*b* will always be positioned "outside" and "before" cutting blade 80. Stabilizer members 82*a*, 82*b* will be "before" cutting blade 80 so long as forward edges 82*aa*, 82*bb* lie on or in front of a reference line normal to cutting direction 80*e* passing through cutting edge 80*a*. Stabilizer members 82*a*, 82*b* will be "outside" cutting blade 80 so long as they are outside of and not in between blade sides 80*b*, 80*c*. By positioning stabilizer members 82*a*, 82*b* outside and before blade 80, the overall stability of the tool during grooving operations is enhanced because the points of contact between the tool and the tire surface are broadened. The stability of the tool is also enhanced by this arrangement because, during grooving operations, a stable "tripod" is formed from blade 80 (which forms one leg of tripod) and stabilizer members 82*a*, 82*b* (which form the other two legs of the tripod). This three-point stance of the tool on tire allows an operator to easily guide the tool at a substantially constant angle during operation. The positioning of the stabilizer members outside the blade also allows an operator to cut an existing groove by "straddling" that groove during cutting and thereby keeping the stabilizer surface against a more even surface of the tire. Finally, the positioning of the stabilizer members outside and before the blade allows an operator to visually confirm that the tool is operating at a proper angle and depth.

By positioning stabilizer members 82*a*, 82*b* outside and before cutting blade 80, the initial cutting pressure applied by an operator during grooving operations tends to rock the blade forward, forcing the stabilizer members to be pulled flat against the surface of a tire. Once the stabilizers are against the tire surface, they are locked in that position by the continued cutting pressure of the operator, thereby maintaining a constant depth and angular positioning of blade 80. The pinching or squeezing effect described above is substantially ameliorated by positioning stabilizer members 82*a*, 82*b* outside and before cutting blade 80, because no portion of the tool behind cutting blade 80 rests on the tire surface during grooving operations. In accordance with this embodiment, cutting edge 80*a* should be biased so as to drive blade 80 downward (or deeper) into a tire during grooving operations. Thus, as blade 80 pulls the tool (and thus stabilizer members 82*a*, 82*b*) to the tire surface, stabilizer members 82*a*, 82*b* act as a stop preventing blade 80 from cutting a deeper groove and locking blade 80 at a proper cutting angle. Alternatively, cutting edge 80*a* could be biased to drive blade 80 along a surface parallel to the tire surface during grooving operations.

Figure 3A:
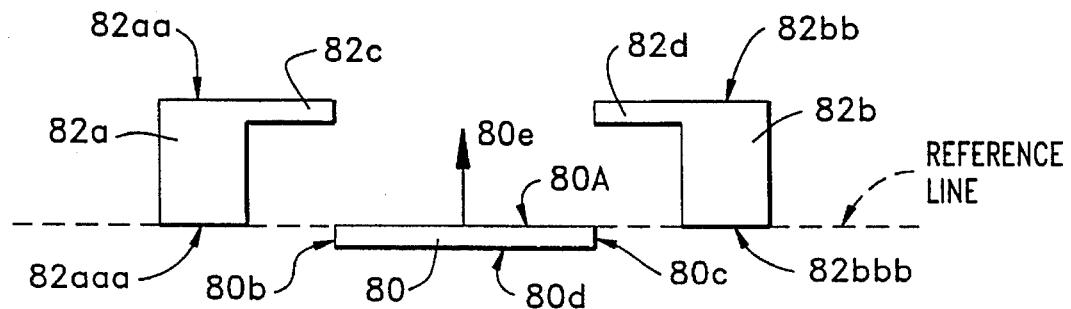
FIG. 3A is a bottom view of a U-shaped cutting blade with first and second stabilizer members positioned according to a further alternative embodiment of the present invention.
Figure 3B:
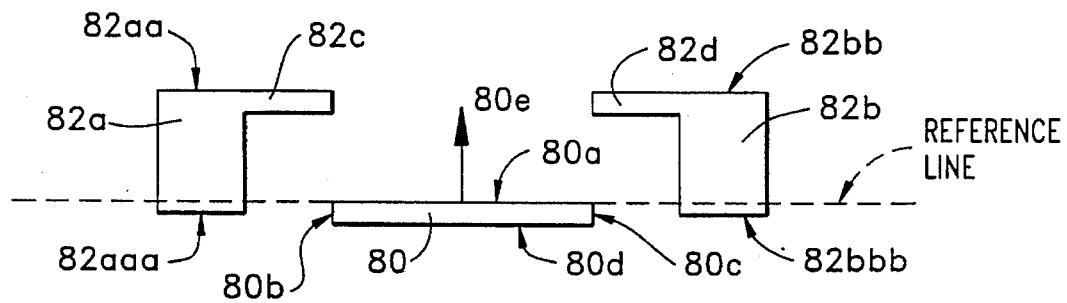
FIG. 3B is a bottom view of a U-shaped cutting blade with first and second stabilizer members positioned according to a still further alternative embodiment of the present invention.
Figure 3C:
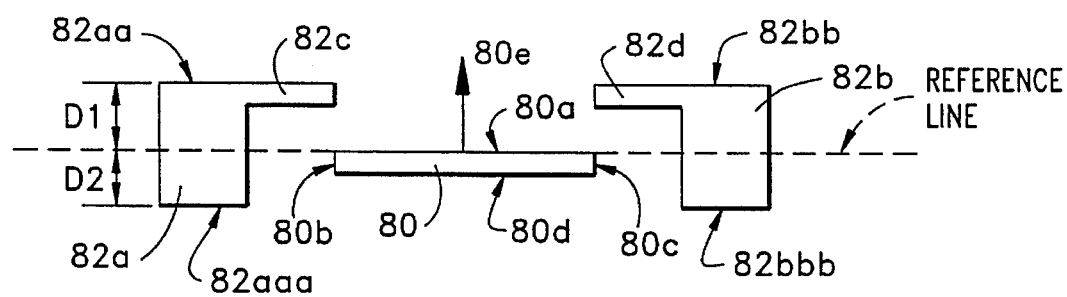
FIG. 3C is a bottom view of a U-shaped cutting blade with first and second stabilizer members positioned according to a still further alternative embodiment of the present invention.
Figure 3D:
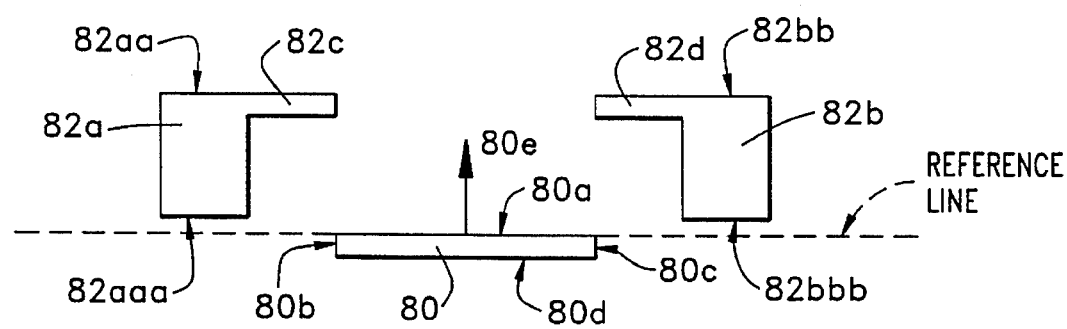
FIG. 3D is a bottom view of a U-shaped cutting blade with first and second stabilizer members positioned according to a still further alternative embodiment of the present invention.

In a preferred embodiment of the present invention shown in FIG. 3A, stabilizer members 82*a*, 82*b* are such that (a) rearward edges 82*aaa*, 82*bbb* lie substantially on a reference line normal to cutting direction 80*e* and passing through cutting edge 80*a* and (b) forward edges 82*aa*, 82*bb* lie in front of the reference line normal to cutting direction 80*e* and passing through cutting edge 80*a*. In further preferred embodiments (shown in FIGS. 3B, 3C), stabilizer members 82*a*, 82*b* are such that (a) rearward edges 82*aaa*, 82*bbb* lie behind a reference line normal to cutting direction 80*e* and passing through cutting edge 80*a*, and (b) forward edges 82*aa*, 82*bb* lie in front of the reference line normal to cutting direction 80*e* and passing through cutting edge 80*a*. In the preferred embodiment of FIG. 3C, the distance D1 between forward edges 82*aa*, 82*bb* and the reference line normal to cutting direction 80*e* passing through cutting edge 80*a* is greater than or equal to the distance D2 between rearward edges 82*aaa*, 82*bbb* and the reference line normal to cutting direction 80*e* passing through cutting edge 80*a*. In a still further embodiment, (shown in FIG. 3D), stabilizer members 82*a*, 82*b* are such that (a) rearward edges 82*aaa*, 82*bbb* lie in front of a reference line normal to cutting direction 80*e* and passing through cutting edge 80*a*, and (b) forward edges 82*aa*, 82*bb* lie in front of the reference line normal to cutting direction 80*e* and passing through cutting edge 80*a*.

Figure 4:
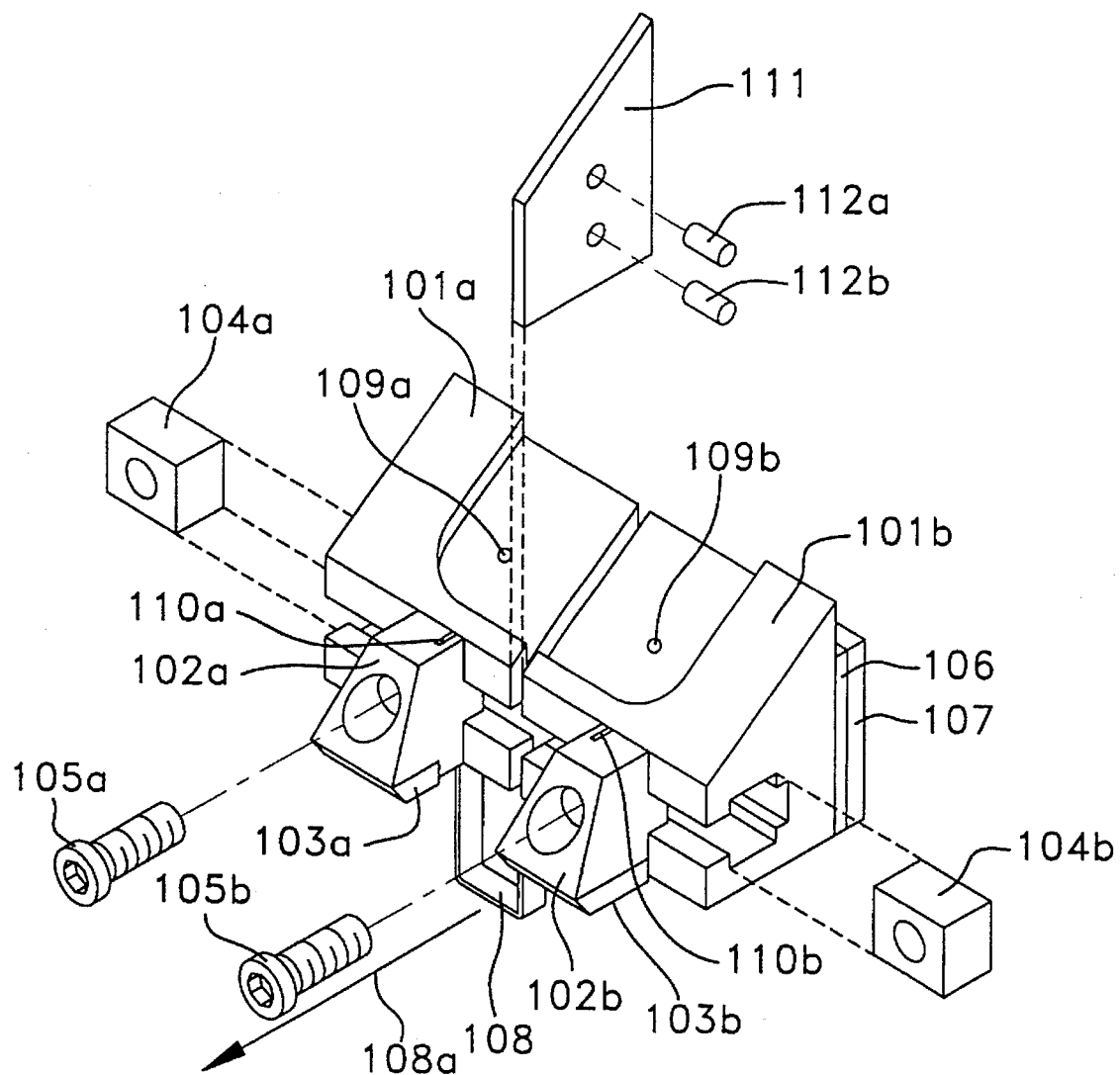
FIG. 4 is a partial perspective view of a head design used on a push type tire groover incorporating an alternative embodiment of the present invention.
Figure 5:
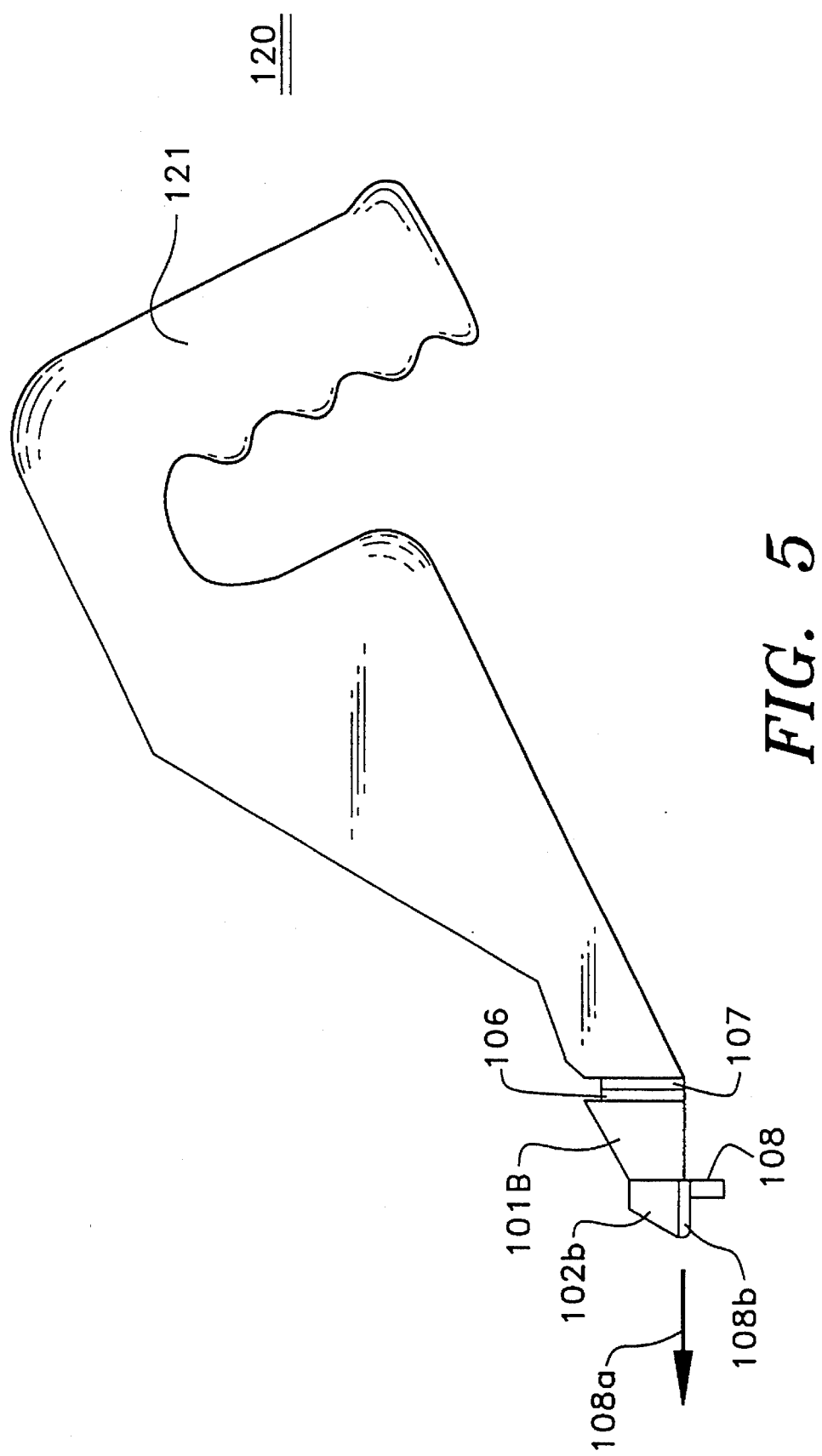
FIG. 5 is a partial side view of a push type tire groover incorporating the embodiment shown in FIG. 4.

Referring now to FIG. 4, there is shown a partial perspective view of the head of a push type tire groover incorporating an alternative embodiment of the present invention. Head halves 101*a*, 101*b* are adapted to receive stabilizer members 102*a*, 102*b* and threaded slidable blocks 104*a*, 104*b*. Slidable blocks 104*a*, 104*b* are adapted to receive clamping screws 105*a*, 105*b* for rigidly securing stabilizer members 102*a*, 102*b* to head halves 101*a*, 101*b*. Stabilizer members 102*a*, 102*b* include antifriction pads 103*a*, 103*b* for reducing frictional forces between a tire surface and stabilizer members 102*a*, 102*b*. Stabilizer members 102*a*, 102*b* further include blade slots 110*a*, 110*b* for receiving and holding the ends of blade 108. Blade 108 has a cutting direction illustrated by arrow 108*a*. Insulating plate 106 and back plate 107 are secured to the back of head halves 101*a*, 101*b*. Electrical connection holes 109*a*, 109*b* are adapted to receive electrical current from an outside source (not shown). Head half insulator 111 positioned between head halves 101*a*, 101*b* electrically insulates head half 101*a* from head half 101*b*. Alignment pins 112*a*, 112*b* are nonconductive and maintain head half 101*a* in an aligned position with head half 101*b*. In FIG. 5 there is shown a partial side view of a push type tire groover 120 having handle 121 incorporating the alternative embodiment shown in FIG. 4.

It will be appreciated that there are considerable variations that can be accomplished in an apparatus of the invention without departing from its scope. As a result, although the preferred embodiment of an apparatus of the invention has been described above, it is emphasized that the invention is not limited to the preferred embodiment, and there exist alternative embodiments that are fully encompassed within the invention's scope, which is intended only to be limited by the scope of the appended claims.

What is claimed is:

1. An apparatus for cutting a tire groove in the road gripping surface of a tire comprising:

stabilizer means for guiding a cutting head member in a cutting direction at a substantially constant angle along the road gripping surface of the tire;

the stabilizer means having a substantially planar surface for slidably engaging the road gripping surface of the tire;

the substantially planar surface having a forward edge and a rearward edge;

the cutting head member having a blade for cutting through the tire in the cutting direction;

the blade having a cutting edge and a back edge; and the forward edge being positioned in front of a reference line normal to the cutting direction passing through the cutting edge of the blade, the rearward edge being positioned substantially even with a reference line normal to the cutting direction passing through the back edge of the blade.

2. The apparatus of claim 1, wherein the blade is biased downward to drive the blade into the tire during grooving operations.

3. The apparatus of claim 2, wherein the stabilizer means has sliding means for reducing the friction between the tire and the stabilizer means during grooving operations.

4. The apparatus of claim 3, wherein the stabilizer means is comprised of first and second stabilizing members, the first and second stabilizing members being rigidly attached to the cutting head member.

5. The apparatus of claim 4, wherein the first and second stabilizer members are L shaped, the first and second stabilizer members each having a leg positioned directly in front of the cutting edge along the cutting direction.

6. The apparatus of claim 1, wherein the blade is biased to drive the blade at an angle substantially parallel to the road gripping surface during grooving operations.

7. An apparatus for cutting a tire groove in the road gripping surface of a tire comprising: stabilizer means for guiding a cutting head member in a cutting direction at a substantially constant angle along said road gripping surface of said tire, said stabilizer means having a substantially planar surface for slidably engaging said road gripping surface of said tire, said substantially planar surface having a forward edge and a rearward edge, said cutting head member having a cutting edge for cutting through said tire in said cutting direction, said forward edge being positioned in front of a reference line normal to said cutting direction passing through said cutting edge, said rearward edge being positioned substantially even with said reference line.

8. The apparatus of claim 1, wherein said cutting edge is biased downward to drive said cutting edge into said tire during grooving operations.

9. The apparatus of claim 2, wherein said stabilizer means has sliding means for reducing the friction between said tire and said stabilizer means during grooving operations.

10. The apparatus of claim 9, wherein said stabilizer means is comprised of first and second stabilizing members, said first and second stabilizing members being rigidly attached to said cutting head member.

11. The apparatus of claim 10, wherein said first and second stabilizer members are L shaped, said first and second stabilizer members each having a leg positioned directly in front of said cutting edge along said cutting direction.

12. The apparatus of claim 1, wherein said cutting edge is biased to drive said cutting edge at an angle substantially parallel to said road gripping surface during grooving operations.

13. An apparatus for cutting a tire groove in the road gripping surface of a tire comprising: stabilizer means for guiding a cutting head member in a cutting direction at a substantially constant angle along said road gripping surface of said tire, said stabilizer means having a forward edge and a rearward edge, said cutting head member having a cutting edge for cutting through said tire in said cutting direction, said forward edge and said rearward edge being positioned in front of a reference line normal to said cutting direction passing through said cutting edge.

14. The apparatus of claim 13, wherein said cutting edge is biased downward to drive said cutting edge into said tire during grooving operations.

15. The apparatus of claim 14, wherein said stabilizer means has sliding means for reducing the friction between said tire and said stabilizer means during grooving operations.

16. The apparatus of claim 15, wherein said stabilizer means is comprised of first and second stabilizing members, said first and second stabilizing members being rigidly attached to said cutting head member.

17. The apparatus of claim 11, wherein said first and second stabilizer members are L shaped, said first and second stabilizer members each having a leg positioned directly in front of said cutting edge along said cutting direction.

18. The apparatus of claim 13, wherein said cutting edge is biased to drive said cutting edge at an angle substantially parallel to said road gripping surface during grooving operations.

19. An apparatus for cutting a tire groove in the road gripping surface of a tire comprising: stabilizer means for guiding a cutting head member in a cutting direction at a substantially constant angle along said road gripping surface of said tire, said stabilizer means having a substantially planar surface for slidably engaging said road gripping surface of said tire, said substantially planar surface having a forward edge and a rearward edge, said cutting head member having a cutting edge for cutting through said tire in said cutting direction, said forward edge being positioned in front of a reference line normal to said cutting direction passing through said cutting edge, said rearward edge being positioned behind said reference line, wherein the distance between said rearward edge and said reference line is less than the distance between said forward edge and said reference line.

20. The apparatus of claim 19, wherein said cutting edge is biased downward to drive said cutting edge into said tire during grooving operations.

21. The apparatus of claim 20, wherein said stabilizer means has sliding means for reducing the friction between said tire and said stabilizer means during grooving operations.

22. The apparatus of claim 21, wherein said stabilizer means is comprised of first and second stabilizing members, said first and second stabilizing members being rigidly attached to said cutting head member.

23. The apparatus of claim 22, wherein said first and second stabilizer members are L shaped, said first and second stabilizer members each having a leg positioned directly in front of said cutting edge along said cutting direction.

24. The apparatus of claim 19, wherein said cutting edge is biased to drive said cutting edge at an angle substantially parallel to said road gripping surface during grooving operations.

* * * * *